United States Patent
Mitchell et al.

(10) Patent No.: US 10,703,078 B2
(45) Date of Patent: Jul. 7, 2020

(54) SHRINKABLE LABEL FILM, A SHRINKABLE LABEL AND A METHOD FOR PROVIDING A SHRINKABLE FILM AND A LABEL

(71) Applicant: UPM RAFLATAC OY, Tampere (FI)

(72) Inventors: Noel Mitchell, Wuppertal (DE); Klaudia Majewska, Bielany Wroclawskie (PL)

(73) Assignee: UPM RAFLATAC OY, Tampere (FI)

( * ) Notice: Subject to any disclaimer, the term of this patent is extended or adjusted under 35 U.S.C. 154(b) by 211 days.

(21) Appl. No.: 15/538,260

(22) PCT Filed: Dec. 22, 2015

(86) PCT No.: PCT/FI2015/050937
§ 371 (c)(1),
(2) Date: Jun. 21, 2017

(87) PCT Pub. No.: WO2016/102781
PCT Pub. Date: Jun. 30, 2016

(65) Prior Publication Data
US 2017/0368804 A1 Dec. 28, 2017

Related U.S. Application Data

(60) Provisional application No. 62/103,093, filed on Jan. 14, 2015, provisional application No. 62/095,816, filed on Dec. 23, 2014.

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/32* (2013.01); *B32B 27/327* (2013.01); *B32B 37/06* (2013.01);
(Continued)

(58) Field of Classification Search
CPC ......... B32B 27/08; B32B 27/32; B32B 37/06; B32B 37/08
See application file for complete search history.

(56) References Cited

U.S. PATENT DOCUMENTS 5,846,620 A  12/1998  Compton
6,025,079 A  2/2000  Ciocca et al.
(Continued)

FOREIGN PATENT DOCUMENTS

EP  1300238 A2  4/2003
EP  1376516 A1  1/2004
(Continued)

OTHER PUBLICATIONS

International Search Report for International Application No. PCT/FI2015/050937; dated Mar. 11, 2016; dated Apr. 15, 2016; 5 Pages.
(Continued)

*Primary Examiner* — Michael N Orlando
*Assistant Examiner* — Jaeyun Lee
(74) *Attorney, Agent, or Firm* — Cantor Colburn LLP

(57) ABSTRACT

The invention relates to a shrink face film and a shrink label comprising said face film. According to an embodiment the shrink face film includes a core layer comprising propylene random copolymer(s) and a modifier which is at least one of the following: olefinic plastomer, olefinic elastomer and ethylene-octene block copolymer. The invention further relates to a method for providing a shrink face film and a method for labelling of an item with a shrink label comprising said face film.

12 Claims, 5 Drawing Sheets

(51) Int. Cl.
*B32B 37/06* (2006.01)
*B32B 37/08* (2006.01)
*B32B 38/00* (2006.01)

(52) U.S. Cl.
CPC ...... *B32B 37/08* (2013.01); *B32B 2038/0028* (2013.01); *B32B 2250/03* (2013.01); *B32B 2250/242* (2013.01); *B32B 2250/40* (2013.01); *B32B 2270/00* (2013.01); *B32B 2307/30* (2013.01); *B32B 2307/514* (2013.01); *B32B 2307/516* (2013.01); *B32B 2307/736* (2013.01); *B32B 2519/00* (2013.01)

(56) References Cited

U.S. PATENT DOCUMENTS

| | | | | |
|---|---|---|---|---|
| 6,231,975 | B1 | 5/2001 | Kong et al. | |
| 2003/0207138 | A1* | 11/2003 | Kong | B32B 27/32 428/515 |
| 2011/0268979 | A1* | 11/2011 | Ambroise | C08L 23/04 428/516 |
| 2012/0052273 | A1* | 3/2012 | Arroyo Villan | B32B 3/266 428/213 |
| 2012/0234152 | A1* | 9/2012 | Carmichael | B26D 1/385 83/677 |
| 2014/0134430 | A1* | 5/2014 | Mitchell | G09F 3/10 428/354 |
| 2014/0208695 | A1* | 7/2014 | Mitchell | B32B 27/08 53/442 |

FOREIGN PATENT DOCUMENTS

| | | |
|---|---|---|
| WO | 2010103191 A1 | 9/2010 |
| WO | 2015004310 A1 | 1/2015 |
| WO | 2015004311 A1 | 1/2015 |
| WO | 2015004312 A1 | 1/2015 |
| WO | 2015004313 A1 | 1/2015 |
| WO | 2015004314 A1 | 1/2015 |
| WO | 2015004315 A1 | 1/2015 |
| WO | 2015004316 A1 | 1/2015 |
| WO | 2016102779 A1 | 6/2016 |
| WO | 2016102780 A1 | 6/2016 |

OTHER PUBLICATIONS

Written Opinion of the International Preliminary Examining Authority International Application No. PCT/FI2015/050937; dated Jan. 5, 2017; International Filing Date: Dec. 22, 2015; 9 Pages.

Written Opinion of the International Searching Authority for International Application No. PCT/FI2015/050937; International Filing Date: Dec. 22, 2015; 7 Pages.

\* cited by examiner

SHRINKABLE LABEL FILM, A SHRINKABLE LABEL AND A METHOD FOR PROVIDING A SHRINKABLE FILM AND A LABEL

TECHNICAL FIELD

The application relates to a shrinkable face film of a label. Especially to a heat shrink face film and labels produced thereof. Further the application concerns a method for manufacturing a shrinkable face film and a label.

BACKGROUND

It is general practice to apply a label to a surface of an item to provide decoration, and/or to display information about the product being sold, such as the content of the item, a trade name or logo. In addition to pressure-sensitive, wet glue and wrap around labels other labelling technologies are available, for example shrink sleeve labels. Shrink sleeve labels may be provided by forming a tube of plastic film, which may be dropped over an item to be labelled and subsequently fed the item through a shrink-tunnel at causing the film to shrink and fit the shape of the item.

SUMMARY

It is an aim of the embodiments to provide a shrinkable face film and a shrinkable label suitable for labelling of an article. Further it is an aim to provide a method for manufacturing a shrinkable face film and a label and a method for labelling of an item.

One embodiment provides a shrink face film for a label capable to shrink under exposure to external energy and a shrink label produced thereof, wherein the face film comprises a first skin layer, a second skin layer and a core layer in between the skin layers. The core layer comprises propylene random copolymer(s) and a modifier which is at least one of the following: olefinic plastomer and olefinic elastomer and ethylene-octene block copolymer.

One embodiment provides a method for manufacturing a shrink face film, the method comprising at least the following steps:
  providing a multilayer face film comprising a first skin layer, a second skin layer and a core layer in between the skin layers;
  stretching of the multilayer face film uniaxially at temperature between 50 and 130° C. so as to provide an uniaxially oriented multilayer face film;
  cooling the uniaxially oriented multilayer face film so as to provide shrink potential in the stretching direction.

One embodiment provides a method for labelling of an item with a shrink label, the method comprising at least the following steps:
  cutting a face film into desired length of a shrink label,
  wrapping the cut face film around a mandrel,
  seaming the cut face film around the mandrel so as to form the shrink label,
  applying the shrink label around the item, wherein the uniaxial orientation direction of the multilayer face film of the shrink label is extending circumferentially around the item,
  heating the shrink label at temperature between 65 and 140° C. so as to form a tight fitting label around the item.

One embodiment provides use of a shrink label for labelling of an item.

One embodiment provides a combination of an item and a shrink label, wherein the label is shrunk around the item.

Further embodiments of the application are presented in the dependent claims.

In an example, the modifier is at least one of the following: propylene/ethylene plastomer, ethylene/octene elastomer and ethylene/butene elastomer. Alternatively the modifier is ethylene-octene block copolymer.

In an example, the core layer comprises between 50 and 70 wt. % of the propylene random copolymer(s) and total amount between 30 and 50 wt. % of the modifier.

In an example, the first skin layer and the second skin layer include propylene terpolymer(s).

In an example, an amount of the terpolymer(s) is between 1 and 99 wt. %.

In an example, the first skin layer and the second skin layer include at least 50 wt. % of propylene terpolymer(s) and further at most 50 wt. % of heterophasic propylene-ethylene copolymer(s) and/or propylene random copolymer(s).

In an example, the first skin layer and the second skin layer include between 50 and 98 wt. % of propylene random copolymer(s).

In an example, the first skin layer and the second skin layer include in addition to propylene random copolymer(s) at most 50 wt. % of heterophasic propylene-ethylene copolymer(s) and/or propylene terpolymer(s).

In an example, the face film is uniaxially oriented comprising an uniaxial orientation ratio between 2 and 10.

In an example, the face film has a shrinkage at least 15%, preferably at least 25%, or at least 35% above temperature of 65° C.

BRIEF DESCRIPTION OF THE DRAWINGS

In the following some examples and embodiments of the invention will be described in more detail with reference to appended drawings, in which.

DETAILED DESCRIPTION

Figure 1:
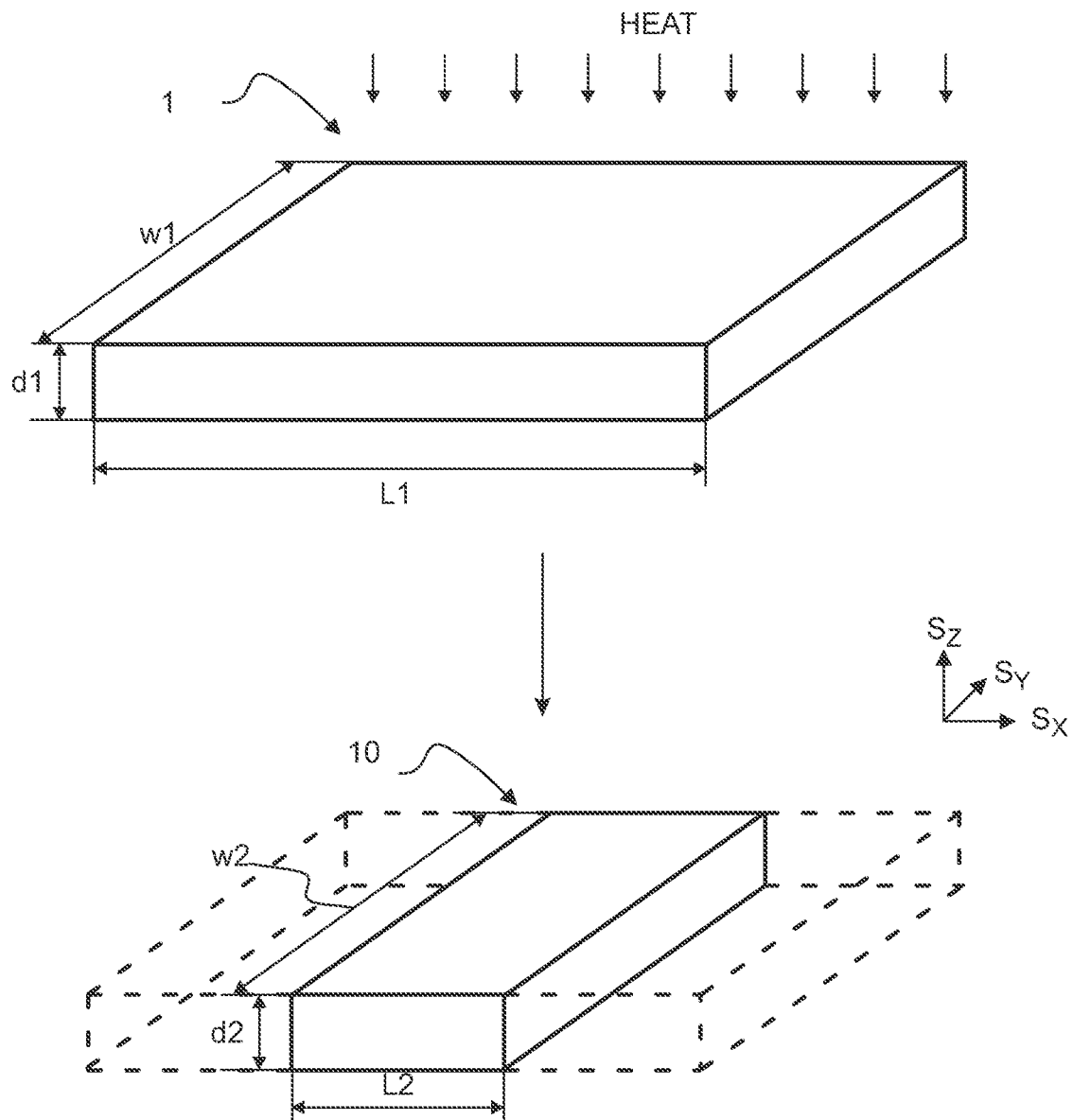
FIG. 1 shows, in a perspective view, an example of heat shrinking of a face film.

In this description and claims, the percentage values relating to an amount of raw materials are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:
Sx, Sy, Sz 3D coordinates, TD transverse direction,
CD cross direction,
MD machine direction,
DR draw ratio (stretching ratio)
MRK1 graphics (printing, print layer),
L1 length of a label film prior to shrinking,
w1 width of a label film prior to shrinking,
d1 thickness of a label film prior to shrinking,
L2 length of a shrunk label film,
w2 width of a shrunk label film,
d2 thickness of a shrunk label film,
1 a face film,
2 a first skin layer,
4 a core layer,
6 a second skin layer,
8 a first longitudinal edge of a face film,
10 a shrunk face film,
11 a leading edge of a face film,
12 a second longitudinal edge of a face film,
13 a trailing edge of a face film,
14 a seam,
15 a roll fed shrink film label,
16 a shrink sleeve label,
18 a shrunk label,
20 an item,
22 a labelled item,
23 a neck of a bottle.

A term "label" refers to a piece of material, which is used for labelling of an item. Label may be used to identify something. Label may be attached to an item. In other words, label is suitable to be applied to a surface of an item to provide decoration, and/or to display information about the product being sold, such as content information, a trade name, a logo, a barcode, or any other graphics. The item may be also called as an article, or a substrate. Preferably, the label comprises a face film and at least some graphics on at least one surface of the face film. A face film may also be referred to as a label film. The graphics may comprise, for example, printed information and/or decoration. The graphics, such as printing or other type of visual coatings, may be applied on the face layer (either side) in a single process or via several successive steps. It is also possible that the visual coating include metallic foil or ink or similar.

Labels may be used in wide variety of labelling applications and end-use areas. For example in beverage labelling, food labelling, home and personal care product labelling, and labelling of industrial products. The surface of the labelled item may be plastic, rubber, glass, metal, ceramic, wood, fabric or paper based. The labelled item may be a container, such as a bottle. For example, polyethylene terephthalate (PET) bottle. Alternatively, the labelled item may be a bottle made of polypropylene (PP) or high density polyethylene (HDPE). Or it could be a glass container a metal container. It could also be any other rigid or solid item or items to be combined together. For example in multi-packed containers or where you might want to pack multiple items together which are not necessarily containers as such, for example separate blocks.

Term "shrinkable" refers to a property of a face film or a label made thereof to shrink under exposure to external energy. Referring to FIG. 1, a heat shrinkable face film 1 shrinks when exposed to an elevated temperature. Heat may be applied via hot air. Alternatively, heat may be applied via infrared radiation (IR) or steam. In response to application of heat, the heat face plastic film or a label comprising said face film is arranged to shrink. The heat shrinkable film is able to shrink in the stretching (orientation) direction of the film. Shrinkage may be focused on a local area or to the whole face film or label area. Due to the shrinking effect, in addition to carrying printed information, the shrunk label may also provide certain amount of additional structural support to the labelled items, for example, to a thin walled plastic bottle. Further, the label material may also provide certain tactile feeling for the end user in addition to the purely visual effects.

"Heat shrink film" or "heat shrink label" refers to a film or label having at least 15% preferably at least 25%, or at least 35% shrinkage between temperature of 65 and 98° C. Below 65° C. shrinkage is less than 15%. In an example, below 50° C. shrinkage is less than 10%. For example, shrinkage may between 0 and 15%, or between 1 and 10% below 65° C.

A heat shrink label comprises or consists of a heat shrink film and is suitable to be fitted around an article to be labelled and shrunk around the article. In addition, a heat shrink label comprises at least some graphics on a surface of the heat shrink film. A heat shrink label may be a heat shrink sleeve label (HS) or a roll-fed shrink film label (RFS). Preferably, a heat shrink label is roll-fed shrink film label, wherein the face film is uniaxially oriented in machine direction. A heat shrink film without additional graphics, such as printing, may be used, for example, as a shrinking seal label, a tamper evident label or security label.

Term "machine direction" MD refers to the running direction $S_x$ of the face film or continuous label web during label manufacturing. "Transverse direction" TD or "cross direction" CD refers to the direction $S_y$ perpendicular to the running direction $S_x$ of the film or label web. Directions are shown, for example, in FIG. 2.

Term "printable surface" refers to a surface, such as a surface of a face layer, that is suitable for printing. Printable surface is also able to maintain the printing, such as printed text and/or graphics. Printable surface has sufficiently high surface energy. A low surface energy may lead to poor retaining capability of printing ink applied to the surface. For example, the plastic film may have a surface energy at least 36 dynes/cm, preferably at least 38 dynes/cm or at least 44 dynes/cm measured according to the standard ASTM D-2578. The surface tension may be between 36 and 60 dynes/cm, preferably between 38 and 56 dynes/cm or between 44 and 50 dynes/cm. The surface tension level may also be maintained higher than or equal to 38 dynes/cm after 50 or 120 days. According to an embodiment a printable heat shrinkable face layer and a label produced thereof comprises at least one printable face layer.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer refers to a configuration of a label structure, where the topmost layer forms upper part of the label structure arranged opposite to the surface attaching the surface of an item when labelled. Topmost layer of a label may be, for example, a skin layer, a print layer, a top coating (over-vanishing layer).

Undermost layer refers to a surface forming bottom part of the label structure arranged opposite to the topmost surface. Undermost layer is in contact with the surface of an article when labelled. In a shrink label the undermost and topmost layer of the label structure may contact each other in a seam area where the edges of the face film are overlapping. In an example, in the seam area edges of the face film are overlapping and a first skin layer and a second skin layer are adjacent to each other. Seam is formed when the adjacent layers are bonded together. Undermost layer of a label may be, for example a skin layer, a print layer, a top coating (over-vanishing layer).

Haze is a property used to describe transparency of a plastic film or a face stock of label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003.

Structure

Shrinkable labels, also referred to as shrink labels, are shrinking under exposure to external energy, such as elevated temperature. Shrinkable labels include both shrink sleeve labels and roll-fed shrink film labels. The shrinkable label may also be one of the following: tamper evident label, security label and shrinking seal label. Shrinkable labels comprise or consist of an oriented non-annealed face film.

A shrink label comprises or consists of an oriented and non-annealed face film, which is therefore shrinkable. The face film may be drawn (stretched) in one direction. The film may be stretched in a machine direction. Alternatively, the film may be stretched in a transverse direction. The resulting film is thus monoaxially (uniaxially) oriented (MO). Monoaxially oriented film may be machine oriented (MDO) or transverse oriented (TDO) in accordance to the direction of the orientation (stretching). The oriented film is suitable for shrinking along the direction of orientation, during exposure to external energy. Preferably, uniaxially oriented film has shrinking less than 10% or less than 5% in other directions (non-shrinking directions) of the film, during exposure to external energy. Expansion of the uniaxially oriented film is less than 5% in other directions (non-shrinking directions) of the film. Such a non-annealed film has not been specifically temperature treated to become a dimensionally stable, non-shrinking film.

A face film may be mono-axially (uniaxially) oriented. The face film of shrink sleeve label may be mono-axially oriented in transverse direction (TD). The face film of roll-fed shrink film label may be mono-axially oriented in machine direction (MD). According to an embodiment, the face film comprises or consists of a transverse direction oriented (TDO) face film, which is non-annealed and therefore shrinkable in the orientation direction. According to another embodiment, the face film comprises or consists of a machine direction oriented (MDO) face film, which is non-annealed and therefore shrinkable in the orientation direction.

During stretching the randomly oriented polymer chains of the extruded films are oriented in the direction of stretching (drawing). Orientation under uniaxial stress provides orientation of polymer chains of the plastic film in the direction of stress provided. In other words, the polymer chains are oriented at least partially in the direction of stretching (drawing). In this application, machine direction (MD) refers to the running direction ($S_x$) of the film during manufacturing, as shown for example in FIG. 2. The degree of orientation of the polymer chains depends on the drawing ratio of the film. In other words, the polymer chains in the film stretched with a higher draw ratio are more oriented when compared to the films stretched with a lower draw ratio. The orientation, like orientation direction and ratio, may have effect on properties of the film, and/or the label comprising the film. The stretching of the film and orientation of the polymer chains may be observed microscopically. Further, the orientation is detectable e.g. from the mechanical properties of the films, such as values of modulus and/or tensile strength.

A ratio of total film thickness before and after stretching is called a "stretch ratio" or "draw ratio" (DR). It may also be referred to as an orientation ratio. In other words, stretch ratio is a ratio of non-oriented (undrawn) film thickness to the oriented (stretched) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ratio (orientation ratio) of the film is 5.

A face film of a shrinkable label may have a monolayer structure. Alternatively, a face film may have a multilayer structure comprising two or more layers. A multilayer face film may have a three layer structure. Alternatively, a multilayer face film may comprise five or even more layers. Preferably, a multilayer face film includes a core layer and equal number of skin layers on both sides of the core layer. For example, a five layer structure comprises a core layer and two skin layers on both sides of the core. For example, a multilayer structure may comprise tie-layers. It is also possible that a multilayer structure includes several core layers.

Figure 2:
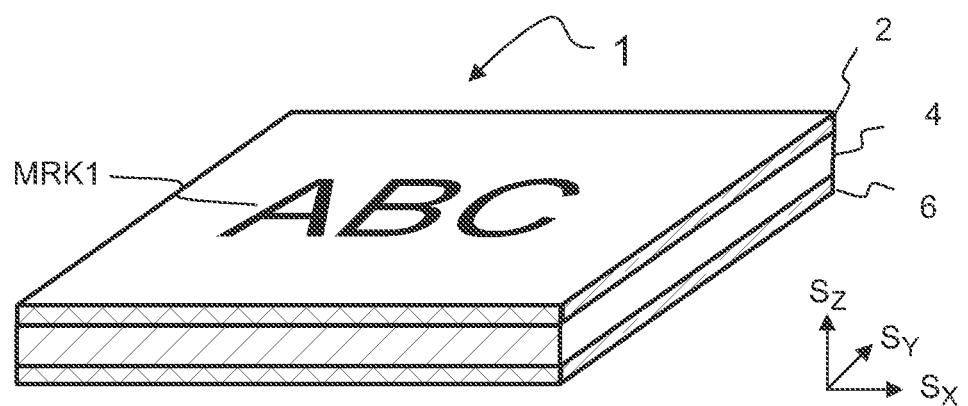
FIG. 2 shows, in a perspective view, an example of a multilayer face film for a label.

Referring to FIG. 2, a multilayer face film structure has a three layer structure. In a three layer structure, a core layer 4 is an intermediate layer. Skin layers 2,6 may be adjoined to the core layer 4. The first skin layer 2 and the second skin layer 6 may also be referred to as a front surface layer and a back surface layer, respectively. The front surface layer may be an outermost layer of the multilayer structure when labelled to a surface of an item. However, the front surface may further be over coated i.e. over-vanished. For example, in order to protect the printed graphics. The back surface layer may be the layer adjacent to a surface of an item. In an example, at least one of the back surface layer and the front surface layer comprises graphics, such as printed information or decoration. Further, the surface layer(s) comprising graphics may be over-coated, for example over-vanished in order to protect the graphics.

Preferably a multilayer face film has a symmetric structure. For example, symmetric three layer face film comprises identical, or nearly identical skin layers on opposite sides of the core layer. Symmetric structure may have effect on quality of the shrunk face film and a shrunk label comprising said face film. For example, wrinkles and curling of the face film may be avoided. Alternatively, a multilayer face film may be asymmetrical. For example, one skin layer may have more or less additives, e.g. anti-block or slip-agent, than the other skin layer. A face film structure may also comprise additional layers, such as tie layers or protective layers. The multilayer face film may also have asymmetry with respect to the skin layer thickness. In other words, there might be some thickness difference between the skin layers, for example in a three layer structure comprising two skin layers the skin layers may have different thickness. A multilayer structure may be laminated or coextruded.

A core layer 4 may form major portion of the multilayer film structure. The core layer may be thicker than the first skin layer and the second skin layer. For example, the core may form from 70% to 90% of the total thickness of the multilayer structure. In an example, a three e layer film has a construction 10%/80%/10% for first skin/core/second skin, respectively. Thickness of the core layer may be from 10 to 50 microns, or from 20 to 40 microns. Thickness of each skin layer may be from 5% to 15% of the total thickness of the multilayer structure. The thickness of a skin layer may be less than 15 microns, preferably around 10 or 7.5 microns or less. The overall thickness of the multilayer film may be from 20 to 70 microns or from 25 to 60 microns, preferably around 50 microns or around 40 microns or less.

Preferably a multilayer film has uniform overall thickness. Uniform thickness refers to a homogeneous thickness of the film, wherein a thickness variation along the film is small. For example in a film area of 100 mm*100 mm variation of the film thickness is less than 10%, preferably between 0.1 and 5.0%. Uniform thickness of the film provides better quality labels, for example, labels having good visual appearance. Uniform film thickness may have effect on the register control and image quality of the printing.

Figure 7:
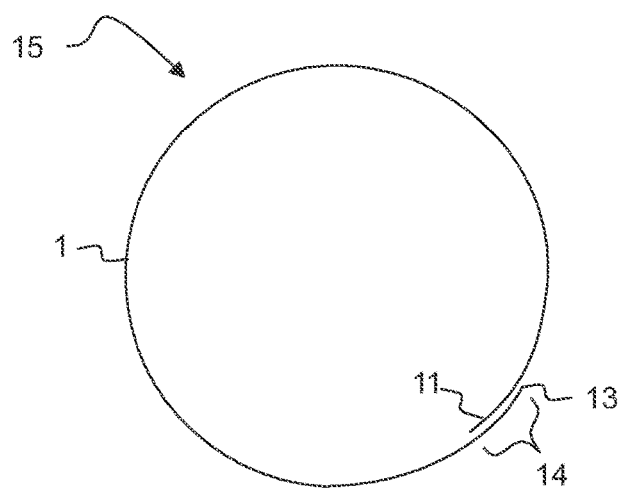
FIG. 7 shows, in a cross-sectional view, an example embodiment of a seamed shrink label, FIG. 8 process for providing a shrink sleeve label and labeling of an article.

Preferably, a shrink label, such as a heat shrink label, comprises or consist of a multilayer face film. In addition, the shrink label may comprise at least some graphics on a surface of the face film. In addition, the shrink label may comprise an adhesive. The adhesive may be applied in a joint area, also referred to a seam area, of cylindrical label, wherein the opposite edges of the face film are overlapping. For example, the adhesive may be applied between the overlapping edges. Referring to FIG. 7, an adhesive may be applied between a trailing edge 13 and a leading edge 11 of a face film 1. When rolling the face film 1 over itself, the trailing and leading edges overlap and form a seam 14. Alternatively, seaming may be provided by hot-seaming with a hot bar. In addition, adhesive (e.g. hot melt adhesive) may be used to hold the label on the surface of the item to be labelled. The adhesive may be applied on the label or on the item in an area between the leading edge and the surface of the item.

According to an embodiment, a shrink label is a shrink sleeve label, such as heat shrink sleeve label. The shrink sleeve label is in a form of tubular sleeve comprising a face film 1 which is oriented uniaxially in a transverse direction ($S_Y$). A shrink sleeve label is formed by seaming a first longitudinal edge 8 and a second longitudinal edge 12 of the face film 1 extending parallel to a machine direction of the face film ($S_x$). In other words, the face film is rolled around the axis extending in the machine direction ($S_x$) of the face film and the seam 14 is formed between the overlapping longitudinal edges 8,12 of the face film 1. Seaming may be provided, for example, by hot-seaming with a hot bar. Such a preformed sleeve tube may be further rolled into a roll and provided for separate labelling process.

Figure 3:
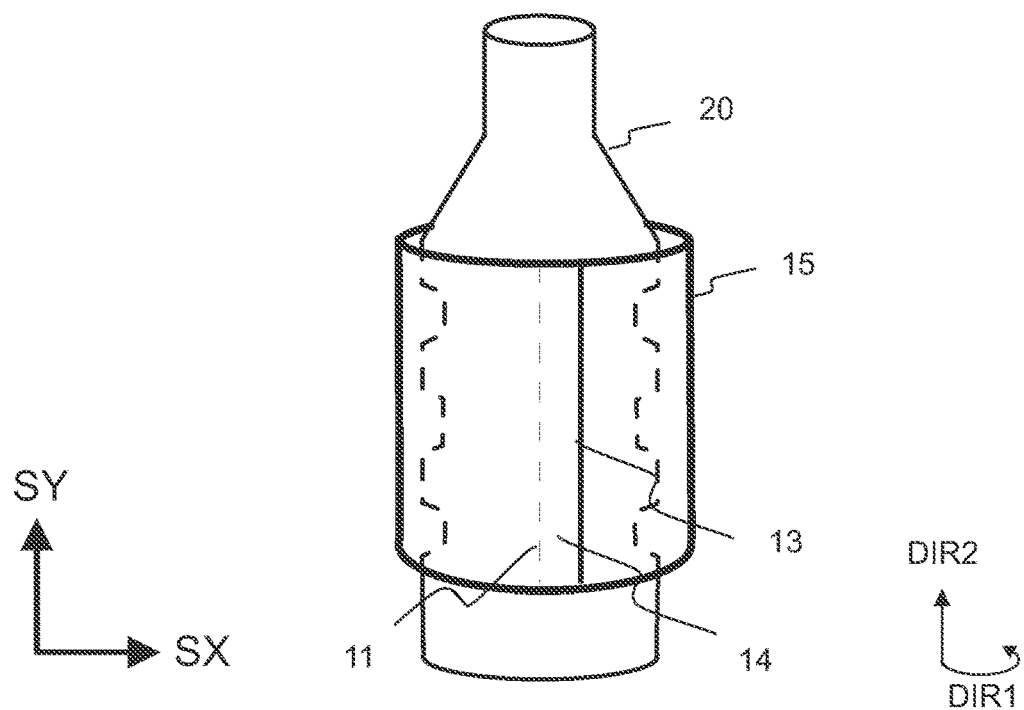
FIG. 3 shows an example of a shrink label around an article (before shrinking)
Figure 4:
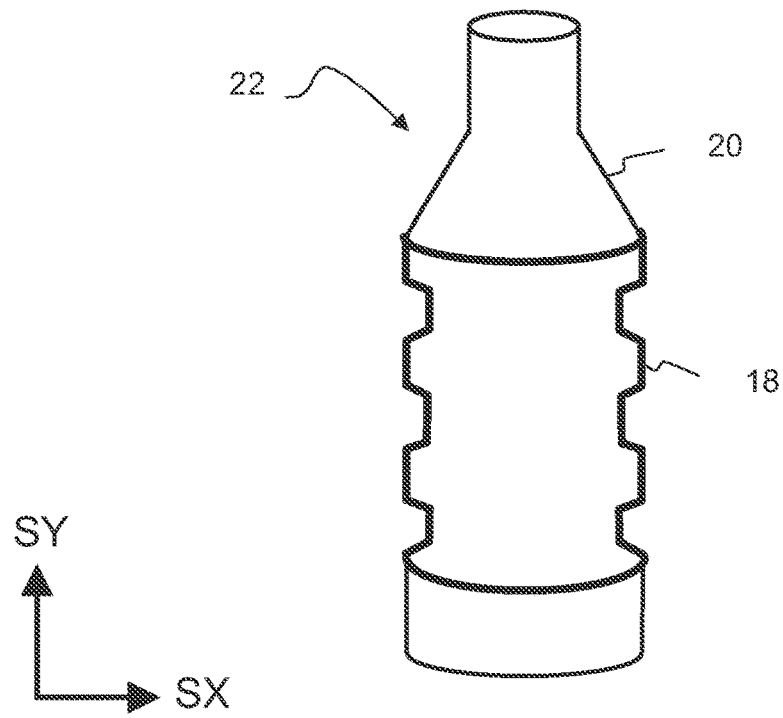
FIG. 4 shows an example of a label fitted on a surface of an article i.e. labeled article comprising a shrunk label (after shrinking)

According to another embodiment, a shrink label is a roll-fed shrink film label comprising a face film 1 which is oriented uniaxially in a machine direction ($S_x$). Referring to FIG. 3 a roll fed shrink film label 15 is formed on-line around an article to be labelled or around a mandrel by seaming a leading edge 11 and a trailing edge 13 of the face film. Preferably, the shrink film label is formed around a mandrel. In other words, the face film is rolled around the axis extending in the transverse direction ($S_y$) of the face film. A label comprises a seam 14 between the overlapping leading edge 11 and trailing edge 13 of the face film. The seam extends perpendicular to the uniaxial orientation direction of the face film. If the label is formed around a mandrel it is further transferred to an article to be labelled. Again, typically the face film 1 has been provided its visual appearance and information during earlier converting steps. The shrink film label 15 is able to shrink in the direction DIR 1 during application of external energy, such as heat. FIG. 4 shows a shrunk label 18 around an item 20.

Materials for Shrinkable Face Films and Labels Produced Thereof

The shrinkable face film structures may comprise at least some of the following components:

Propylene terpolymer(s) may be used for a core and/or skin layer(s) of a multilayer face film structure and labels produced thereof.

Propylene terpolymer(s) refers to copolymer(s) comprising three distinct monomers, of which one is propylene. Other monomers may be ethylene, 1-butene, 1-hexene or 1-octene. Propylene terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene.

Propylene terpolymer(s) may have density 0.90 g/cm$^3$, when measured according to standard ISO 1183. Melt flow rate may be between 0.9 and 7.5 g/10 min, when measured according to standard ISO 1133 at 230 degrees C./2.16 kg. Melting temperature may be between 127 and 137 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 137 degrees C. (ISO 11357-3).

In an example, propylene terpolymer comprises density of 0.90 g/cm$^3$, when measured according to standard ISO 1183. Melt flow rate may be 6 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 0.9 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 7.5 g/10 min, when measured according to standard ISO 1133 at 230 degrees C./2.16 kg. Melting temperature may be 132 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 127 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 128 degrees C. (ISO 11357-3).

In an example, propylene terpolymer comprises density of 0.90 g/cm$^3$, when measured according to standard ISO 1183. Melt flow rate may be 5.5 g/10 min, when measured according to standard ISO 1133 at 230 degrees C./2.16 kg. Melting temperature may be 130 degrees C. (ISO 11357-3).

Random copolymer of propylene (also referred to as propylene random copolymer) may be used for a core layer and/or for skin layer(s). Propylene random copolymer may be propylene-ethylene copolymer or propylene-butylene copolymer Random copolymer of propylene with ethene may have density between 0.89 and 0.91 g/cm$^3$.

In an example, random copolymer of propylene with ethene may have density of 0.9 g/cm$^3$, when measured according to standard ISO 1183. Melt flow rate MFR (at 230° C./2.16 kg) may be 1.7 g/10 min, when measured according to ISO 1133.

In an example, random copolymer of propylene with ethene may have density of 0.9 g/cm$^3$, when measured according to standard ISO 1183. Melt flow rate MFR (at 230° C./2.16 kg) may be 2.2 g/10 min, when measured according to ISO 1133. Vicat softening temperature may be 122° C., when measured according to standard ISO 306 (A50 (50° C./h 10N)).

Block copolymer of propylene (also referred to as propylene block copolymer or heterophasic polypropylene) may be used for the skin layer(s). In the following embodiments the block copolymer of propylene refers to heterophasic propylene-ethylene copolymer(s). Examples for the heterophasic propylene-ethylene copolymers are provided below.

Preferably, the following heterophasic propylene-ethylene copolymers may be used for the skin layer(s):

In an example, heterophasic propylene-ethylene copolymer having melt flow rate MFR (at 230° C./2.16 kg) of 0.8 g/10 min, when measured according to ISO 1133. Density may be of 905 kg/m$^3$. A XS content may be of 28 wt. %, referring to xylene soluble species in the propylene copolymer. Ethylene content may be 15.5 wt. %. Melting temperature may be 140° C., when measured according to standard ISO 11357-3.

In an example, heterophasic propylene-ethylene copolymer having melt flow rate MFR (at 230° C./2.16 kg) of 0.85 g/10 min, when measured according to ISO 1133. Melting temperature may be 166° C., when measured according to standard ISO 3146.

In an example heterophasic propylene-ethylene copolymer having melt flow rate MFR (at 230° C./2.16 kg) of 3.0 g/10 min, when measured according to ISO 1133. Melting temperature may be 168° C., when measured according to standard ISO 11357-3.

A modifier used for a core and/or skin layer(s) of a multilayer face film may be: olefinic elastomer(s), olefinic plastomer(s) or ethylene-octene block copolymer(s). For example, ethylene elastomer(s), ethylene-octene block copolymer(s), propylene elastomer(s), propylene plastomer(s), or any mixture thereof. Propylene elastomer(s) and propylene plastomer(s) may be propylene-ethylene copolymers produced with a special catalyst and technology. A plastomer is a polymer that softens when heated. It hardens when cooled, but remains flexible. An elastomer is elastic polymer resembling natural rubber, returning to its original shape after being stretched or compressed. Propylene plastomers and propylene elastomers have narrow molecular weight distribution (MWD), broad crystallinity distribution and wide melt range.

In an example, a core and/or skin layer(s) may comprise at least one of the following modifiers: propylene/ethylene plastomer, ethylene/octene elastomer, ethylene-octene block copolymer, and ethylene/butene elastomer.

In an example, a core layer may comprise propylene elastomer(s), propylene plastomer(s), or any mixture thereof.

Ethylene-octene block copolymers may have density between 0.866 and 0.887 g/cm$^3$, when measured according to ASTM D792. Melt index may be between 1 and 5 g/10 min, when measured according to ASTM D1238 (at 2.16 kg, 190° C.). DSC melting temperature may be between 119 and 122° C.

In an example, ethylene-octene block copolymer may have density of 0.877 g/cm$^3$, when measured according to ASTM D792. Melt index may be 5 g/10 min, when measured according to ASTM D1238 (at 2.16 kg, 190° C.). DSC melting temperature may be 122° C.

In an example, ethylene-octene block copolymer may have density of 0.866 g/cm$^3$, when measured according to ASTM D792. Melt index may be 1 g/10 min, when measured according to ASTM D1238 (at 2.16 kg, 190° C.). DSC melting temperature may be 121° C.

In an example, ethylene-octene block copolymer may have density of 0.887 g/cm$^3$, when measured according to ASTM D792. Melt index may be 5 g/10 min, when measured according to ASTM D1238 (at 2.16 kg, 190° C.). DSC melting temperature may be 119° C.

In an example, ethylene-octene block copolymer may have density of 0.866 g/cm$^3$, when measured according to ASTM D792. Melt index may be 5 g/10 min, when measured according to ASTM D1238 (at 2.16 kg, 190° C.). DSC melting temperature may be 119° C.

Ethylene-butene elastomer(s) may have density between 0.862 and 0.880 g/cm$^3$, when measured according to ASTM D792. Melt index may be between 0.8 and 5 g/10 min, when measured according to ASTM 1238 (at 2.16 kg, 190° C.). Mooney viscosity may be between 7 and 24 MU, when measured according to standard ASTM 1646 (ML 1+4 at 121° C.). Total crystallinity may be between 12 and 19%. DSC melting peak may be between 34 and 76° C., when measured at heating rate of 10° C./min. Glass transition temperature may be may be −58 and −42° C. (DSC inflection point).

In an example, ethylene-butene elastomer may have density 0.862 g/cm$^3$, when measured according to ASTM D792. Melt index may be 1.2 g/10 min, when measured according to ASTM 1238 (at 2.16 kg, 190° C.). Mooney viscosity may be 19 MU, when measured according to standard ASTM 1646 (ML 1+4 at 121° C.). Total crystallinity may be 12%. DSC melting peak may be 34° C., when measured at heating rate of 10° C./min. Glass transition temperature may be may be −58° C. (DSC inflection point).

In an example, ethylene-butene elastomer may have density 0.862 g/cm$^3$, when measured according to ASTM D792. Melt index may be 3.6 g/10 min, when measured according to ASTM 1238 (at 2.16 kg, 190° C.). Mooney viscosity may be 9 MU, when measured according to standard ASTM 1646 (ML 1+4 at 121° C.). Total crystallinity may be 12%. DSC melting peak may be 40° C., when measured at heating rate of 10° C./min. Glass transition temperature may be may be −56° C. (DSC inflection point).

In an example, ethylene-butene elastomer may have density 0.865 g/cm$^3$, when measured according to ASTM D792. Melt index may be 5 g/10 min, when measured according to ASTM 1238 (at 2.16 kg, 190° C.). Mooney viscosity may be 7 MU, when measured according to standard ASTM 1646 (ML 1+4 at 121° C.). Total crystallinity may be 13%. DSC melting peak may be 35° C., when measured at heating rate of 10° C./min. Glass transition temperature may be may be −53° C. (DSC inflection point).

In an example, ethylene-butene elastomer may have density 0.880 g/cm³, when measured according to ASTM D792. Melt index may be 0.8 g/10 min, when measured according to ASTM 1238 (at 2.16 kg, 190° C.). Mooney viscosity may be 24 MU, when measured according to standard ASTM 1646 (ML 1+4 at 121° C.). Total crystallinity may be 19%. DSC melting peak may be 64° C., when measured at heating rate of 10° C./min. Glass transition temperature may be may be −44° C. (DSC inflection point).

Ethylene-octene elastomer(s) may have density between 0.857 and 0.908 g/cm³, when measured according to ASTM D792. Melt index may be between 0.5 and 18 g/10 min, when measured according to ASTM 1238 (at 2.16 kg, 190° C.). Mooney viscosity may be between 3 and 33 MU, when measured according to standard ASTM 1646 (ML 1+4 at 121° C.). Total crystallinity may be between 13 and 34%. DSC melting peak may be 38 and 104° C., when measured at heating rate of 10° C./min. Glass transition temperature may be may be −58 and −31° C. (DSC inflection point).

In an example, ethylene-octene elastomer may have density 0.857 g/cm³, when measured according to ASTM D792. Melt index may be 1 g/10 min, when measured according to ASTM 1238 (at 2.16 kg, 190° C.). Mooney viscosity may be 25 MU, when measured according to standard ASTM 1646 (ML 1+4 at 121° C.). Total crystallinity may be 13%. DSC melting peak may be 38° C., when measured at heating rate of 10° C./min. Glass transition temperature may be may be −58° C. (DSC inflection point).

In an example, ethylene-octene elastomer may have density 0.863 g/cm³, when measured according to ASTM D792. Melt index may be 0.5 g/10 min, when measured according to ASTM 1238 (at 2.16 kg, 190° C.). Mooney viscosity may be 33 MU, when measured according to standard ASTM 1646 (ML 1+4 at 121° C.). Total crystallinity may be 16%. DSC melting peak may be 56° C., when measured at heating rate of 10° C./min. Glass transition temperature may be may be −55° C. (DSC inflection point).

In an example, ethylene-octene elastomer may have density 0.870 g/cm³, when measured according to ASTM D792. Melt index may be 5 g/10 min, when measured according to ASTM 1238 (at 2.16 kg, 190° C.). Mooney viscosity may be 8 MU, when measured according to standard ASTM 1646 (ML 1+4 at 121° C.). Total crystallinity may be 19%. DSC melting peak may be 59° C., when measured at heating rate of 10° C./min. Glass transition temperature may be may be −53° C. (DSC inflection point).

In an example, ethylene-octene elastomer may have density 0.880 g/cm³, when measured according to ASTM D792. Melt index may be 18 g/10 min, when measured according to ASTM 1238 (at 2.16 kg, 190° C.). Mooney viscosity may be 3 MU, when measured according to standard ASTM 1646 (ML 1+4 at 121° C.). Total crystallinity may be 24%. DSC melting peak may be 76° C., when measured at heating rate of 10° C./min. Glass transition temperature may be may be −50° C. (DSC inflection point).

The modifier(s) of olefinic elastomers/plastomers may have density between 0.863 and 0.888 g/cm³, when measured according to ASTM D 792. Melt index may be between 1.1 and 9.1 g/10 min, when measured according to standard ASTM D 1238 at 190 degrees C./2.16 kg.

In an example, propylene-ethylene copolymer plastomer/elastomer comprises density between 0.863 and 0.888 g/cm³, when measured according to ASTM D 792. Melt flow rate may be between 2 and 8 dg/min, when measured according to standard ASTM D 1238 at 230 degrees C., 2.16 kg. Total crystallinity may be between 14 and 44%. Glass transition temperature may be between −33 and −17 degrees C.

In an example, olefinic elastomer is produced by using metallocene catalyst technology and the ethylene content being 11 wt. %. Density may be 0.873 g/cm³, when measured according to standard ASTM D1501. Melt flow rate may be between 8 g/10 min. Melt index may be 3.6 g/10 min, when measured according to standard ASTM D 1238 at 190 degrees C., 2.16 kg.

In an example, olefinic elastomer comprises isotactic propylene repeat units with random ethylene distribution and the ethylene content being 11 wt. %. Density may be 0.874 g/cm³, when measured according to standard ASTM D1501. Melt flow rate may be between 3 g/10 min. Melt index may be 1.1 g/10 min, when measured according to standard ASTM D 1238 at 190 degrees C., 2.16 kg.

In an example, olefinic elastomer is produced by using metallocene catalyst technology and the ethylene content being 15 wt. %. Density may be 0.863 g/cm³, when measured according to standard ASTM D1501. Melt flow rate may be between 20 g/10 min. Melt index may be 9.1 g/10 min, when measured according to standard ASTM D 1238 at 190 degrees C., 2.16 kg.

Modifiers, such as polyolefin elastomer(s) and/or polyolefin plastomer(s) may have a positive effect on the ability of the film to be stretched (oriented) and thus on the shrinkage potential of the film.

Heterophasic propylene-ethylene copolymer(s) may be used in a core layer. Heterophasic propylene-ethylene copolymer(s) may have melt flow rate MFR (at 230° C./2.16 kg) between 0.6 and 27 g/10 min, when measured according to ISO 1133. Density may be between 880 and 905 kg/m³. Melting temperature may be between 140 and 170° C., when measured according to standard ISO 11357-3.

In an example, heterophasic propylene-ethylene copolymer may have melt flow rate MFR (at 230° C./2.16 kg) of 0.8 g/10 min, when measured according to ISO 1133. Density may be of 905 kg/m³. A XS content may be of 28 wt. %, referring to xylene soluble species in the propylene copolymer. Ethylene content may be 15.5 wt. %. Melting temperature may be 140° C., when measured according to standard ISO 11357-3.

In an example, heterophasic propylene-ethylene copolymer may have melt flow rate MFR (at 230° C./2.16 kg) of 0.85 g/10 min, when measured according to ISO 1133. Melting temperature may be 166° C., when measured according to standard ISO 3146.

In an example heterophasic propylene-ethylene copolymer may have melt flow rate MFR (at 230° C./2.16 kg) of 3.0 g/10 min, when measured according to ISO 1133. Melting temperature may be 168° C., when measured according to standard ISO 11357-3.

Preferably the heterophasic propylene-ethylene copolymers presented in the following may be used for the core layer:

In an example heterophasic propylene-ethylene copolymer may have density of 0.88 g/cm³, when measured according to standard ISO 1183. Melt flow rate MFR (at 230° C./2.16 kg) may be 0.6 g/10 min, when measured according to ISO 1133. Melting temperature may be 140° C., when measured according to standard ISO 11357-3. Vicat softening temperature may be 60° C., when measured according to standard ISO 306 (A50 (50° C./h 10N)).

In an example heterophasic propylene-ethylene copolymer may have melt flow rate MFR (at 230° C./2.16 kg) may be 27 g/10 min, when measured according to ISO 1133.

Vicat softening temperature may be 72.8° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 7.5 g/10 min, when measured according to ISO 1133. Vicat softening temperature may be 94° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 9.5 g/10 min, when measured according to ISO 1133. Melting temperature may be 147° C., when measured according to standard ISO 11357-3. Vicat softening temperature may be 112° C., when measured according to standard ISO 306 (A50 (50° C./h 10N)).

In an example heterophasic propylene-ethylene copolymer may have density of 0.89 g/cm$^3$, when measured according to standard ISO 1183. Melt flow rate MFR (at 230° C./2.16 kg) may be 6 g/10 min, when measured according to ISO 1133. Vicat softening temperature may be 89° C., when measured according to standard ISO 306 (A50 (50° C./h 10N)).

Polybutene-ethylene copolymer(s) may be used in a core layer. Polybutene-ethylene copolymer(s) may have melt flow rate MFR (at 190° C./2.16 kg) between 2.5 and 4 g/10 min, when measured according to standard ISO 1133. Density may be between 0.897 and 0.911 g/cm$^3$ at 20° C., when measured according to standard ISO 1183. Melting temperature may be between 81 and 97° C.

In an example, polybutene-ethylene copolymer may be a random copolymer of butene-1 with low ethylene content. It may have melt flow rate MFR (at 190° C./2.16 kg) of 4 g/10 min. Density may be of 0.911 kg/m$^3$. Melting temperature may be 97° C.

In an example, polybutene-ethylene copolymer may be a random copolymer of butene-1 with high ethylene content. It may have melt flow rate MFR (at 190° C./2.16 kg) of 3.5 g/10 min. Density may be of 0.897 kg/m$^3$. Melting temperature may be 81° C.

In an example, polybutene-ethylene copolymer may be a random copolymer of butene-1 with medium ethylene content. It may have melt flow rate MFR (at 190° C./2.16 kg) of 2.5 g/10 min. Density may be of 0.901 kg/m$^3$. Melting temperature may be 85° C.

Additives, such as anti-blocking agent and/or slip additive may be used for skin layer(s).

Compositions for Shrinkable Face Films and Labels Produced Thereof

According to an embodiment, a face film has a structure comprising multiple layers. A face film may have a three layer structure comprising a first skin layer 2, a core layer 4 and a second skin layer 6. Alternatively multilayer face film may comprise five or more layers. Multilayer film structure comprises at least two outer skin layers. First outer skin layer also referred to as a first skin layer may be a topmost layer of the label structure. Second outer skin layer also referred to as a second skin may be an undermost layer of the label structure. At least one of the first skin layer and the second skin layer may be printed.

The multilayer plastic film structure may comprise or consist of layers having different compositions. For example, skin layer(s) may have different composition when compared to the composition of the core layer. Also first and second skin layers may have different compositions. Alternatively, the first and second skin layers may have equal compositions.

Skin Layer

According to a first embodiment, a first skin layer and a second skin layer include propylene terpolymer(s). Terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene.

An amount for propylene terpolymer(s) may be between 1 and 99 wt. %. In an example, an amount of propylene terpolymer(s) is between 50 and 99 wt. %, or between 60 and 98 wt. %. In addition to propylene terpolymer(s), the skin layers may further comprise heterophasic propylene-ethylene copolymer(s) at most 50 wt. % and/or propylene random copolymer(s) at most 50 wt. %. An amount of heterophasic propylene-ethylene copolymer(s) may be between 0 and 50 wt. %. An amount of propylene random copolymer(s) may be between 0 and 50 wt. %. In an example, the skin layer(s) include at least 50 wt. % of propylene terpolymer(s), at most 50 wt. % of heterophasic propylene-ethylene copolymer(s) and/or at most 50 wt. % of propylene random copolymer(s).

Propylene terpolymer may have density of 0.90 g/cm$^3$, when measured according to standard ISO 1183. Melt flow rate may be between 0.9 and 7.5 g/10 min, when measured according to standard ISO 1133 at 230 degrees C./2.16 kg. Melting temperature may be between 127 and 137 degrees C. (ISO 11357-3). Examples of propylene terpolymer(s) suitable for the skin layer(s) are presented above.

The skin layer composition comprising propylene terpolymers may have effect on mechanical properties of the film. For example, providing optimal modulus and stiffness. The skin layer composition may further have effect on providing optimal shrinkage profile. It may also have effect on providing tack-free and/or glossy surface.

According to a second embodiment, skin layer(s) of the multilayer face film comprise propylene block copolymer(s), i.e. heterophasic propylene-ethylene copolymer(s). The skin layer(s) may further comprise at least one modifier. In an example, the skin layer(s) comprise modifier(s) of olefinic elastomer(s) and/or olefinic plastomer(s), or ethylene-octene block copolymer(s). In an example, the skin layer(s) comprise at least one of the following modifiers: propylene/ethylene plastomer, ethylene/octene elastomer, ethylene-octene block copolymer, and ethylene/butene elastomer. In an example, the skin layer(s) comprise propylene elastomer(s), propylene plastomer(s), or any mixture thereof. In an example, the skin layer(s) comprise at least one of the following modifiers: propylene/ethylene plastomer, ethylene/octene elastomer, and ethylene/butene elastomer. An amount of propylene block copolymer(s) may be from 1 to 99 wt. %. In an example, between 60 and 99 wt. %, or between 70 and 99 wt. %. An amount of the modifier(s) may be from 1 to 30 wt. %. The modifier(s) may have effect on shrinkage of the film. The modifier(s) may also improve clarity and flexibility of the skin layers.

Examples of propylene block copolymers and modifiers suitable for the skin layers are presented in previous disclosure of the materials for shrinkable face films.

According to a third embodiment, skin layer(s) of the multilayer face film comprise propylene random copolymer(s). An amount for propylene random copolymer(s) may be between 1 and 99 wt. %. In an example, an amount of propylene random copolymer(s) is between 50 and 99 wt. %, or between 60 and 98 wt. %. In addition to propylene random copolymer(s), the skin layers may further comprise heterophasic propylene-ethylene copolymer(s) at most 50 wt. % and/or propylene terpolymer(s) at most 50 wt. %. An amount of heterophasic propylene-ethylene copolymer(s) may be between 0 and 50 wt. %. An amount of propylene terpolymer(s) may be between 0 and 50 wt. %. In an example, the skin layer(s) include at least 50 wt. % of propylene random copolymer(s), at most 50 wt. % of heterophasic propylene-ethylene copolymer(s) and/or at most 50 wt. % of propylene terpolymer(s).

Additionally, the skin layer(s) of the previous embodiments may include additives, such as anti-blocking agent and/or slip additive. An amount of additive(s) is preferably less than 2 wt. %, for example between 0.5 and 2 wt. %, or between 0.5 and 1 wt. %.

Core Layer

According to a first embodiment, a core layer of the multilayer face film comprises propylene terpolymer(s). Terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene.

An amount of propylene terpolymer(s) may be in a range from 50 to 100 wt. %, or from 50 to 90%, preferably from 50 to 70 wt. %.

Examples of propylene terpolymer(s) suitable for the core layer are presented above.

The core layer may further comprise at least one modifier. The core layer may comprise olefinic elastomer(s) and/or olefinic plastomer(s), or ethylene-octene block copolymer(s). The modifier may be: ethylene elastomer(s), ethylene-octene block copolymer(s), propylene elastomer(s), propylene plastomer(s), or any mixture thereof. Total amount of the modifier(s) may be between 0 and 50 wt. %, or between 10 and 50 wt. %, preferably between 30 and 50 wt. %.

Examples of modifier(s) suitable for the core layer are presented above. In an example, the core layer includes at least one of the following modifiers: propylene/ethylene plastomer, ethylene/octene elastomer, ethylene-octene block copolymer, and ethylene/butene elastomer. In an example, the core layer includes at least one of the following modifiers: propylene/ethylene plastomer, ethylene/octene elastomer, and ethylene/butene elastomer.

The core layer composition comprising propylene terpolymer(s) and at least one modifier may have effect on providing optimal shrinkage for the film. It may further have effect on clarity of the film.

In addition, the core layer may comprise one of the following: heterophasic propylene-ethylene copolymer or butene-ethylene copolymer. In an example, the core layer includes propylene terpolymer(s), at least one modifier, and polybutene-ethylene copolymer. Polybutene-ethylene copolymer may be random copolymer of 1-butylene (1-butene) with ethene. An amount of polybutene-ethylene copolymer may be from 0 to 30 wt. %, preferably from 0 to 20 wt. %, and more preferably from 0 to 10 wt. %. In an example, the core layer includes propylene terpolymer(s), at least one modifier, and heterophasic propylene-ethylene copolymer. An amount of heterophasic propylene-ethylene copolymer may be from 0 to 30 wt. %, preferably from 0 to 20 wt. %, and more preferably from 0 to 10 wt. %. Alternative amounts for polybutene-ethylene copolymer and heterophasic propylene-ethylene copolymer may be between 0 and 50 wt. %, or between 10 and 50 wt. %, preferably between 30 and 50 wt. %.

According to a second embodiment, a core layer of the multilayer face film comprises random copolymer of propylene. An amount of random copolymer of propylene may be in a range from 50 to 100 wt. %, or from 50 to 90%, preferably from 50 to 70 wt. %.

Examples of random copolymer of propylene(s) suitable for the core layer are presented above.

The core layer further comprises at least one modifier. The core layer may comprise olefinic elastomer(s) and/or olefinic plastomer(s). The modifier(s) of the core layer may be: propylene elastomer(s), propylene plastomer(s), or any mixture thereof. In an example, the core layer comprises propylene/ethylene plastomer(s), ethylene/octene elastomer(s), ethylene/butene elastomer(s), or any combination thereof. Total amount of the modifier(s) may be between 0 and 50 wt. %, or between 10 and 50 wt. %, preferably between 30 and 50 wt. %.

Examples of modifier(s) suitable for the core layer are presented above.

According to a third embodiment, a core layer of the multilayer face film comprises random copolymer of propylene. An amount of random copolymer of propylene may be in a range from 50 to 100 wt. %, or from 50 to 90 wt. %, preferably from 50 to 70 wt. %.

Examples of random copolymer of propylene(s) suitable for the core layer are presented above.

The core layer further comprises a modifier of ethylene-octene block copolymer. An amount of ethylene-octene block copolymer may be between 0 and 50 wt. %, or between 10 and 50 wt. %, preferably between 30 and 50 wt. %.

Examples of ethylene-octene block copolymer suitable for the core layer are presented above.

According to a fourth embodiment, a core layer of the multilayer face film comprises propylene terpolymer. An amount of propylene terpolymer may be in a range from 50 to 100 wt. %, or from 50 to 90%, preferably from 50 to 70 wt. %.

Examples of propylene terpolymer(s) suitable for the core layer are presented above.

The core layer further comprises a modifier of ethylene-octene block copolymer. An amount of ethylene-octene block copolymer may be between 0 and 50 wt. %, or between 10 and 50 wt. %, preferably between 30 and 50 wt. %.

Examples of ethylene-octene block copolymer suitable for the core layer are presented above.

The core layer may further comprise one of the following: heterophasic propylene-ethylene copolymer or a butene-ethylene copolymer. Examples for those are presented above.

In an example, the core layer includes propylene terpolymer(s), ethylene-octene block copolymer and polybutene-ethylene copolymer. Polybutene-ethylene copolymer may be random copolymer of 1-butylene (1-butene) with ethene. An amount of polybutene-ethylene copolymer may be from 0 to 30 wt. %, preferably from 0 to 20 wt. %, and more preferably from 0 to 10 wt. %. In an example, the core layer includes propylene terpolymer(s), ethylene-octene block copolymer and heterophasic propylene-ethylene copolymer. An amount of heterophasic propylene-ethylene copolymer may be from 0 to 30 wt. %, preferably from 0 to 20 wt. %, and more preferably from 0 to 10 wt. %. Alternative amounts for polybutene-ethylene copolymer and heterophasic propylene-ethylene copolymer may be between 0 and 50 wt. %, or between 10 and 50 wt. %, preferably between 30 and 50 wt. %.

According to a fifth embodiment, a core layer of the multilayer face film comprises propylene terpolymer. An amount of propylene terpolymer(s) may be in a range from 50 to 100 wt. %, or from 50 to 90%, preferably from 50 to 70 wt. %. Examples of propylene terpolymer(s) suitable for the core layer are presented above.

Propylene terpolymer may have density of 0.90 g/cm$^3$, when measured according to standard ISO 1183. Melt flow rate may be between 0.9 and 7.5 g/10 min, when measured according to standard ISO 1133 at 230 degrees C./2.16 kg. Melting temperature may be between 127 and 137 degrees C. (ISO 11357-3). Examples of propylene terpolymer(s) suitable for the core layer are presented above.

The core layer may further comprises at least one modifier. The core layer may comprise olefinic elastomer(s) and/or olefinic plastomer(s). The modifier may be: propylene elastomer(s), propylene plastomer(s), or any mixture thereof. In other words, the core layer comprises at least one of the following modifiers: propylene elastomer(s) and propylene plastomer(s).

Total amount of the modifier(s) may be between 0 and 50 wt. %, or between 10 and 50 wt. %, preferably between 30 and 50 wt. %.

The modifier may have density between 0.863 and 0.888 g/cm$^3$, when measured according to standard ASTM D 792. Melt index may be between 1.1 and 9.1 g/10 min, when measured according to standard ASTM D 1238 at 190 degrees C./2.16 kg.

In an example, a core layer comprises propylene-ethylene copolymer plastomer/elastomer comprising density between 0.863 and 0.888 g/cm$^3$, when measured according to standard ASTM D 792. Melt flow rate may be between 2 and 8 dg/min, when measured according to standard ASTM D 1238 at 230 degrees C., 2.16 kg. Total crystallinity may be between 14 and 44%. Glass transition temperature may be between −33 and −17 degrees C.

In an example, a core layer comprises olefinic elastomer produced by using metallocene catalyst technology and the ethylene content being 11 wt. %. Density may be 0.873 g/cm$^3$, when measured according to standard ASTM D1501. Melt flow rate may be between 8 g/10 min. Melt index may be 3.6 g/10 min, when measured according to standard ASTM D 1238 at 190 degrees C., 2.16 kg.

In an example, a core layer comprises olefinic elastomer comprising isotactic propylene repeat units with random ethylene distribution and the ethylene content being 11 wt. %. Density may be 0.874 g/cm$^3$, when measured according to standard ASTM D1501. Melt flow rate may be between 3 g/10 min. Melt index may be 1.1 g/10 min, when measured according to standard ASTM D 1238 at 190 degrees C., 2.16 kg.

In an example, a core layer comprises olefinic elastomer produced by using metallocene catalyst technology and the ethylene content being 15 wt. %. Density may be 0.863 g/cm$^3$, when measured according to standard ASTM D1501. Melt flow rate may be between 20 g/10 min. Melt index may be 9.1 g/10 min, when measured according to standard ASTM D 1238 at 190 degrees C., 2.16 kg.

The core layer composition comprising propylene terpolymer(s) and at least one modifier may have effect on providing optimal shrinkage for the film. It may further have effect on clarity of the film.

Examples of Multilayer Structures for a Shrinkable Face Film and a Label Produced Thereof Example 1

The multilayer structure comprises a three layer structure comprising a first skin layer and a second skin layer according to the first embodiment disclosed in previous and a core layer between the skin layers according to the second embodiment disclosed in previous.

Example 2

The multilayer structure comprises a three layer structure comprising a first skin layer and a second skin layer according to the first embodiment disclosed in previous and a core layer between the skin layers according to the third embodiment disclosed in previous.

Example 3

The multilayer structure comprises a three layer structure comprising a first skin layer and a second skin layer according to the first embodiment disclosed in previous and a core layer between the skin layers according to the fourth embodiment disclosed in previous.

Example 4

The multilayer structure comprises a three layer structure comprising a first skin layer and a second skin layer according to the second embodiment disclosed in previous and a core layer between the skin layers according to the first embodiment disclosed in previous.

For example, the skin layer(s) comprise heterophasic propylene-ethylene copolymer(s) and olefinic elastomer(s) and/or olefinic plastomer(s). For example, the core layer comprises propylene terpolymer(s) and olefinic elastomer(s) and/or olefinic plastomer(s).

Example 5

The multilayer structure comprises a three layer structure comprising a first skin layer and a second skin layer according to the second embodiment disclosed in previous and a core layer between the skin layers according to the fourth embodiment disclosed in previous.

Example 6

The multilayer structure comprises a three layer structure comprising a first skin layer and a second skin layer according to the first embodiment disclosed in previous and a core layer between the skin layers according to the fifth embodiment disclosed in previous.

Example 7

The multilayer structure comprises a three layer structure comprising a first skin layer and a second skin layer according to the third embodiment disclosed in previous and a core layer between the skin layers according to the second embodiment disclosed in previous.

Example 8

The multilayer structure comprises a three layer structure comprising a first skin layer and a second skin layer according to the third embodiment disclosed in previous and a core layer between the skin layers according to the third embodiment disclosed in previous.

Manufacturing of Labels and Labelling

Manufacturing a Face Film

Non-oriented face film may be manufactured by using either a cast or blown-film extrusion process. A shrinkable face film may be obtained by stretching (drawing) the extruded face film to an extent several times its original dimension to orient the film. Stretching may also be designated as orienting. Extruded film may be stretched uniaxially in transverse direction (across the film). Alternatively, the film may be stretched uniaxially in machine direction (lengthwise).

The face film of the shrink label may be drawn (stretched) in one direction. The film may be drawn in a machine direction or in a transverse direction. The resulting film is thus monoaxially (uniaxially) oriented (MO). Monoaxially oriented film may be machine oriented (MDO) or transverse oriented (TDO) in accordance to the direction of the orientation (stretching). Monoaxial orientation ratio may be between 2 and 10, preferably between 4 and 8. Preferably, a face film is oriented uniaxially in machine direction.

The stretching in TD may be performed by heating the continuous film web and stretching it in transverse direction on a tenter frame. The stretching may be performed below the melting temperature of the polymer and/or at or near the glass transition temperature of the polymer. Preferably the film stretching temperature is between 50 and 130° C. The stretching in MD may be performed by means of a machine direction orienter via rolls with increasing speed. The stretching occurs due to a difference in speed between the last and the first rolls. In a stretching process the rolls are heated sufficiently to bring the substrate to a suitable temperature, which is normally below the melting temperature ($T_m$), or around the glass transition temperature ($T_g$) of the polymer. In an example, orientation process temperature is between 50 and 130° C.

After uniaxial stretching (orienting), the face film is not heat set, i.e. not annealed, in order to provide shrinkage for the film. After stretching at elevated temperature the film is immediately cooled by passing the film through cooling rolls. Cooling of the film may be gradual. Cooling may be performed with one or more cooling rolls having decreasing temperature profile starting at or just below stretching temperature and decreasing gradually to around room temperature. Cooling is performed in steps and the cooling roll temperatures may be selected between 20 and 80° C. Stretching and subsequent cooling may provide suitable shrink potential for the film. Due to the shrink potential, the oriented films are able to shrink under elevated temperature towards the non-oriented state of the film. In an example, subsequent application of heat causes the oriented film to relax and the oriented film may return towards or substantially back to its original un-stretched dimensions. Thus, the oriented films primarily shrink in the orientation direction.

The uniaxially stretched and subsequently cooled films are referred to non-annealed films having shrinkage potential and ability to shrink when external energy is provided to the film. In other words, non-annealed film refers to a film which is not relaxed to become temperature stable. Non-annealed film has shrinkage potential, when e.g. temperature exceeds a certain limit. Respectively annealed film refers to film which is relaxed to have better temperature stability, for example, within a certain temperature range defined by the annealing temperature.

Referring to FIG. 1, not heat set (non-annealed), uniaxially oriented face film 1 having dimensions of length L1, width w1 and thickness d1, is arranged to shrink under application of heat so as to form a shrunk face film 10. Uniaxial orientation direction $S_x$, of the film is parallel to the film length L1 and L2. Uniaxial orientation direction may be, for example, transverse direction TD. Alternatively, uniaxial orientation direction may be machine direction MD. The corresponding film dimensions are length L2, width w2 and thickness d2 after shrinking. Under heating the uniaxially oriented film 1 is capable of shrinking in the direction of the orientation $S_x$. In other words, the length of the film reduces, when heating is applied, i.e. L1>L2. If the film is oriented only in one direction $S_x$, in the perpendicular direction $S_y$, the dimension w1 is substantially equal to w2 after heat treatment. Same applies to the labels comprising uniaxially oriented face film.

Temperature of the orientation process may have effect on the degree of shrinkage of the face film and label comprising said film. For example, orientation process temperature in range of 50 to 130 degrees C. may provide at least 10%, or at least 15%, preferably at least 25%, or at least 35% shrinkage of the face film between subsequent heating with temperature in range of 65 and 98° C. At 50° C. shrinkage is below 10%.

The oriented face film, i.e. shrinkable face film, may be printed in order to provide visual effect and/or to display information. Printing may be performed by using traditional printing processes, for example, flexographic, gravure offset, and digital printing methods, such as liquid-toner, dry-toner or ink-jet processes. A multilayer face film may comprise printing on a surface of a first skin layer. Alternatively the reverse side of the multilayer structure may be printed, i.e. a second skin layer may comprise printing. The graphic patterns may be printed on at least one of the outer skin layers of the multi-layered film. When printing the second skin layer of the film, the film may be referred to as reverse-printed. In reverse-printed film the printing is viewed through the multilayer face film i.e. the printing is visible through the face film. With these kind of films no further layers may be needed to protect the printing e.g. from abrasion or scratching during handling of the labelled items.

The graphics, such as printing or other type of visual coatings, may be applied in a single process or via several printing or coating steps. It is also possible that the visual coating include metallic foil or ink or similar. It is most common that the printing is provided on the inside of the sleeve label, closest side to the item to be labelled. Printing is usually subsequently over-varnished. A shrinkable label being one of the following: tamper evident label, security label and shirking seal label may be un-printed. They may be clear. Alternatively they may be pigmented or they may comprise printing.

The face film surface may be treated prior to printing. The print receiving surface may be treated by flame treatment, corona treatment, or plasma treatment in order to increase the surface tension of the surface and to enhance, for example, adhesion of the printed graphics. A low surface tension may lead to poor retaining capability of printing ink applied to the surface.

The face film may also be treated after printing. Such treatment may include, for example, over-varnishing or other coating methods to provide protection to the printing and/or adding other enhanced visual effects in addition to the information print.

Manufacturing a Shrink Label

A shrinkable face film may be used for providing shrinkable labels, also referred to as shrink labels or shrinking labels. The shrink labels are suitable for labelling of a wide range of product designs and particularly suitable for highly contoured containers and products comprising curved sections, recesses and/or protrusions at their outer surface. The labels comprising heat shrink multilayer face film are suitable for items of glass, plastic, ceramics, glass, and metal. Shrinkage properties of films and/or labels enable labels to be used in highly contoured containers. The item may comprise or consists of polyethylene terephthalate (PET). The item may have a shape of a bottle. The films of the invention may also be used for labelling of batteries.

Shrinkable labels are shrinking under exposure to external energy, such as elevated temperature. Shrink labels are referred to more particularly as heat shrink labels when shrinkable under exposure of elevated temperature i.e. heat. Shrinkable labels include both shrink sleeve labels and roll-fed shrink film labels. The shrinkable label may also be one of the following: tamper evident label, security label and shrinking seal label. The label may be a full body label, i.e. the label may cover the whole outer surface of the item labelled. Alternatively, the label may cover the item only partially. For example, a cap of the bottle may be covered with a shrinkable label.

Figure 5:
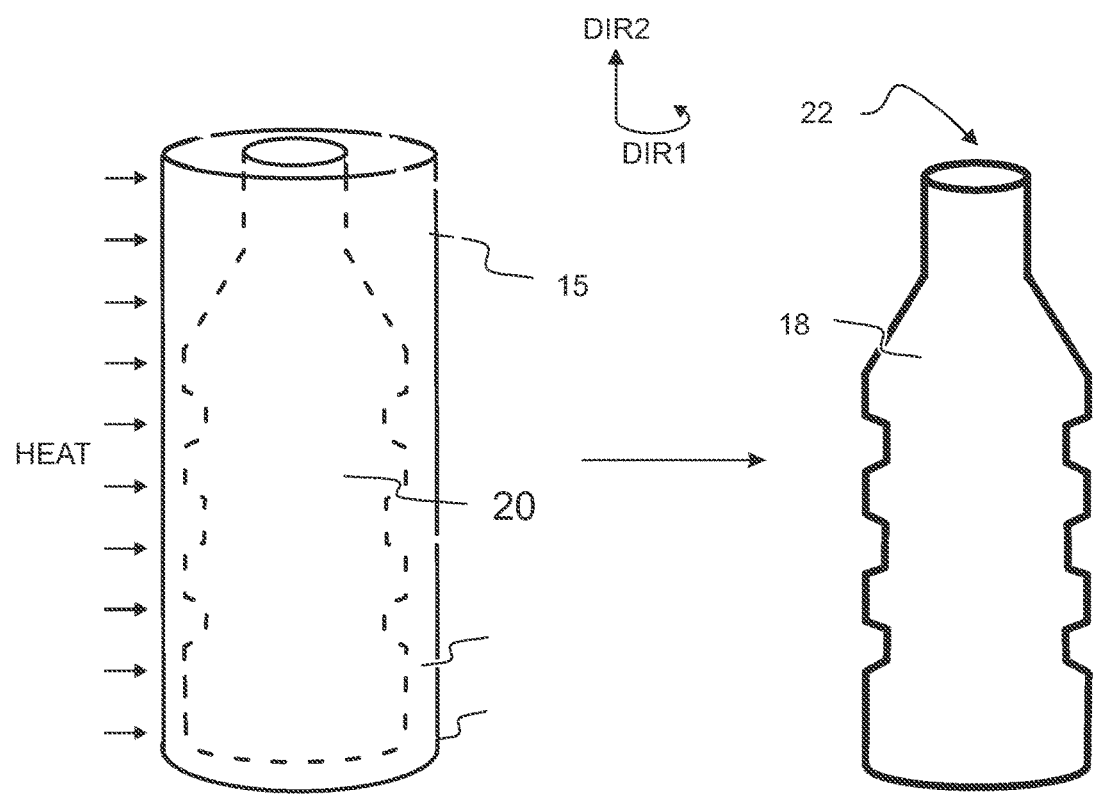
FIG. 5 shows an example of a shrink label around an article and a labeled article.
Figure 6:
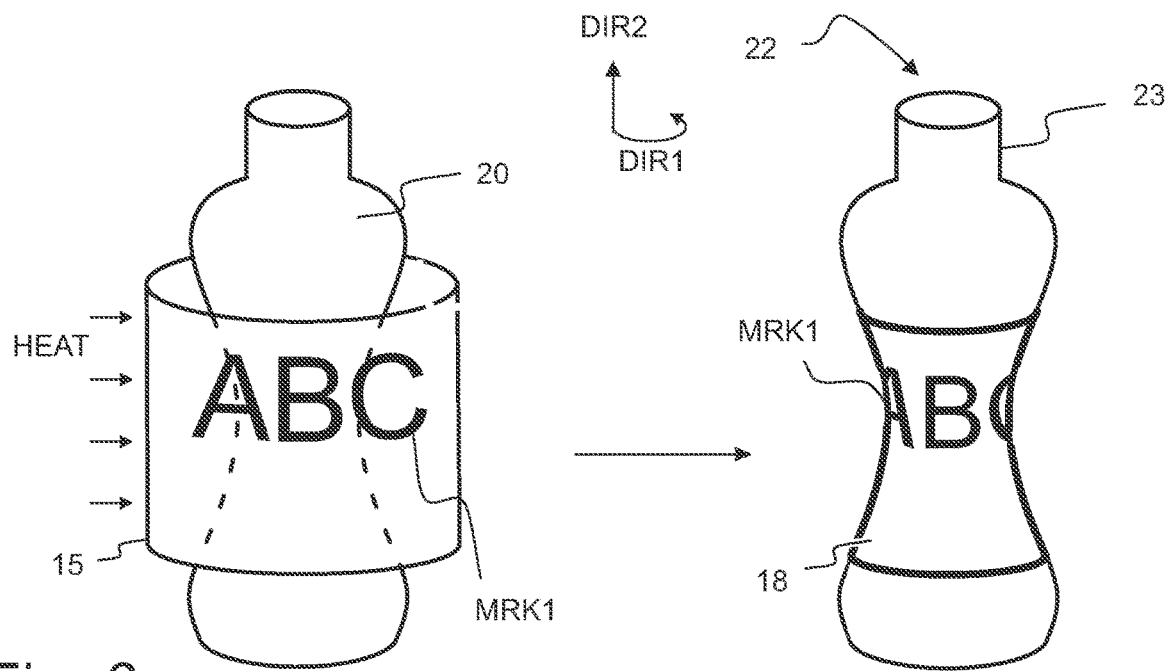
FIG. 6 shows an example of a shrink label around an article and a labeled article.

Referring to FIG. 5 a shrink label 15 may be a full body label, i.e. the shrunk label 18 may cover substantially the whole outer surface of the item 20. Alternatively, the label 15,16 may cover the item only partially, as shown in FIGS. 4 and 6. Referring to FIG. 6, for example a neck of a bottle 23 may be left without a label, or a separate and/or different label may be used for the bottle neck part than for the bottle volume part.

"Roll-fed shrink film label" (RFS) refers to a label, which is applied in an labelling process, where a ready cut face film is rolled over a container or a mandrel so as to form an individual label, which is subsequently shrunk around an article to be labelled under exposure to external energy, such as elevated temperature. Under exposure to the external energy the label is able to conform shape and size of the article. A roll-fed shrink film label comprises or consists of a shrinkable face film. The face film may be a monolayer or multilayer film. In addition, the label comprises at least some graphics on a surface of the face film.

"Shrink sleeve label" also referred to as "a shrink sleeve label" or to as "a shrinkable sleeve label" refers to a label in the form of tubular sleeve 16. Individual labels may be cut form the continuous tubular sleeve and fitted around an article to be labelled and shrunk around the article under exposure to external energy, such as elevated temperature. Tubular sleeve is made from a shrink face film by seaming. A shrink sleeve label comprises or consists of a shrinkable face film. The face film may be a monolayer or multilayer film. In addition, the shrink sleeve label comprises at least some graphics on a surface of the face film.

The roll-fed shrink film labelling process may be called as on-line labelling process. Roll-fed shrink films may be uniaxially oriented in machine direction (MD). When a label consists of a MDO shrink film as a face layer, and the machine direction of the face layer extends circumferentially around the item, the label is arranged to shrink primarily in the orientation direction under exposure to external energy, e.g. when heated. Subsequent shrinking process at high temperatures enables tight fitting of the label around the item. Heat shrinking may occur at a shrink tunnel, where for example hot air may be blown towards passing items. Alternatively shrinkage may be provided by hot steam, infrared radiation, or the like, or any combination of the above methods. Preferably, the shrinkage is carried out in a steam tunnel.

Figure 8:
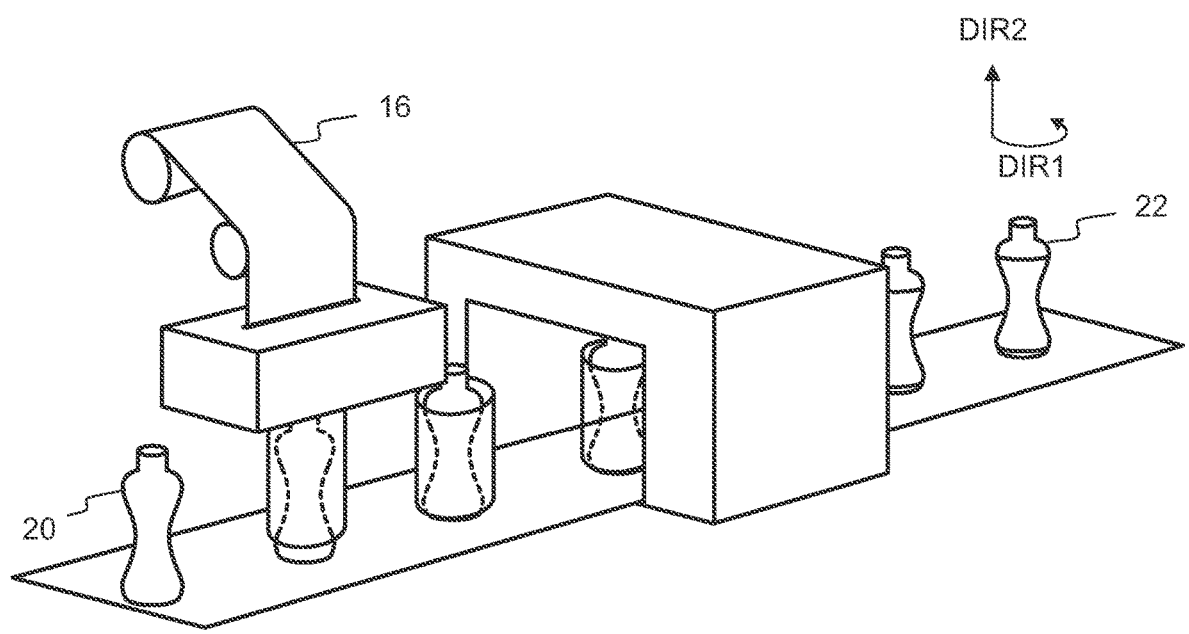

Referring to FIG. 8, "shrink-sleeve labelling" or "heat shrinkable sleeve film labelling" refers to a labelling process, where a preformed label tube (or sleeve) is introduced around an item. Shrink sleeve label comprises or consists of transverse direction oriented (TDO) shrink film. The film is seamed into a continuous tube label around the axis extending to the machine direction ($S_x$). Seaming may be provide e.g. by using hot-seaming with the hot bar or adhesive. The formed continuous tube (or sleeve) 16 is cut into predetermined lengths and supplied as a form of individual tube label around an item 20. The item or container may be warmed before a cylindrical tube label is introduced over it. Tube around an item is heated in order to shrink the tube label around the item so as to form a labelled item 22. The transverse direction orientation of the tube label extends circumferentially around the item. Thus, the label primarily shrinks in the transverse direction.

According to an embodiment, a method for providing a shrink label and subsequent labelling of an item may comprise at least the following steps:
 providing a multilayer face film comprising a first skin layer and a second skin layer;
 stretching the multilayer face film uniaxially in machine direction at temperature between 50 and 130° C. so as to provide uniaxially in MD oriented multilayer face film;
 cooling the uniaxially oriented multilayer face film so as to provide shrink potential in the uniaxial stretching direction;
 providing a continuous MD oriented multilayer face film to a roll, unrolling and printing the face film;
 cutting the printed face film into desired length of a label;
 wrapping the cut multilayer face film (the label comprising desired length) around a cylindrical mandrel;
 seaming the seam area so as to provide the shrink label;
 replacing the label from the cylindrical mandrel around an item to be labelled;
 applying external energy providing shrinking of the label so as to fit the label tightly around the item.

Cooling may be gradual and performed in steps comprising temperatures between 20 and 80° C. Seaming may include e.g. hot-seaming with a hot bar. Applying external energy may comprise heating the shrink label at temperature between 65 and 140° C. so as to form a tight fitting label around the item.

Alternatively, seaming may be provided by using adhesive, such as UV-acrylic hot-melt adhesive or hot-melt adhesive based on block copolymers. Alternatively seam may be formed by solvent seaming, laser-welding or ultrasonic radiation.

At least some/all embodiments have effect on providing good shrinkage for the face film and label comprising said film at the steam-tunnel operating temperatures. At least some/all embodiments have shrinkage between at least 15%, preferably at least 25%, or at least 35% above 65 degrees C. At 50° C. shrinkage may be less than 10%, or less than 5%.

In an example, shrinkage may be measured according to the following method: providing a sample with measured and marked 100 mm*100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

At least some/all embodiments have effect on providing no-label look or appearance, when attached to the surface of an item. The clear no-label look allows the objects beneath such label, i.e. the bottle or contents, to be visible through such label. Clarity of the film and a label comprising said film can be measured and evaluated by the haze values. The overall haze of the multilayer film and label consisting of said multilayer film may be less than 25%, preferably less than 15%, and most preferably less than 10% or less than 5%, when measured according to the standard ASTM D1003. For example, the haze of the face film between 2 and 10%, may have effect on providing good visual appearance for the face films and labels thereof.

At least some/all embodiments have effect on printability of the face film. The face film may have effect on enabling high printing quality. According to some/all embodiments the face film has excellent ink adhesion and register control, allowing for example gravure printing. Wetting surface tension of the print receiving skin layer may be higher than or equal to 38 mN/m, for example 44 mN/m, when measured according to standard ISO 8296. For example, the print receiving skin layer may have a surface energy at least 36 dynes/cm, preferably at least 38 dynes/cm or at least 42 dynes/cm measured according to the standard ASTM D-2578. The surface energy may be between 36 and 60 dynes/cm, preferably between 38 and 56 dynes/cm or between 42 and 50 dynes/cm. Surface energy expressed in units of dynes/cm meaning force/unit length may also be expressed in units of mN/m.

Further Numbered Examples 6.1-6.10

Example 6.1 A shrink face film for a label capable to shrink under exposure to external energy, the face film comprising a first skin layer, a second skin layer and a core layer in between the skin layers, wherein the first skin layer and the second skin layer comprise propylene terpolymer.

Example 6.2 A shrink face film according to example 6.1, wherein the propylene terpolymer is at least one of the following: 1-butene/propylene/ethylene, propylene/ethylene/1-hexene and propylene/ethylene/1-butene.

Example 6.3 A shrink face film according to example 6.1 or 6.2, wherein an amount of the propylene terpolymer(s) is between 1 and 99 wt. %

Example 6.4 A shrink face film according to claim any of the preceding examples, wherein the core layer comprises propylene terpolymer and at least one modifier, wherein the at least one modifier comprises propylene elastomer(s), propylene plastomer(s), or any combination thereof.

Example 6.5 A shrink face film according to example 6.4, wherein the core layer comprises between 50 and 90 wt. % of propylene terpolymer and between 10 and 50 wt. % of the modifier.

Example 6.6 A shrink face film according to claim any of the preceding examples, wherein the face film is uniaxially oriented comprising an uniaxial orientation ratio between 2 and 10.

Example 6.7 A shrink face film according to claim any of the preceding examples, wherein the face film has a shrinkage at least 15%, preferably at least 25%, or at least 35% above 65° C.

Example 6.8 A shrink label comprising a face film according to any of the preceding examples 6.1-6.7.

Example 6.9 A method for manufacturing a shrink face film,
providing a multilayer face film comprising a first skin layer, a second skin layer and a core layer in between the skin layers, wherein the first skin layer and the second skin layer comprise propylene terpolymer;
stretching of the multilayer face film uniaxially at temperature between 50 and 130° C. so as to provide an uniaxially oriented multilayer face film;
cooling the uniaxially oriented multilayer face film so as to provide shrink potential in the stretching direction.

Example 6.10 A method for labelling of an item with a shrink label comprising a shrink face film any of the preceding examples 6.1-6.7:
cutting the face film into desired length of a shrink label;
wrapping the cut face film around a mandrel;
seaming the cut face film around the mandrel so as to form the shrink label;
applying the shrink label around the item, wherein the uniaxial orientation direction of the multilayer face film of the shrink label is extending circumferentially around the item; and
heating the shrink label at temperature between 65 and 140° C. so as to form a tight fitting label around the item.

Further Numbered Examples 7.1-7.34

Example 7.1. A shrink face film for a label capable to shrink under exposure to external energy, the face film comprising a first skin layer, a second skin layer and a core layer in between the skin layers, wherein the first skin layer and the second skin layer comprises propylene terpolymer, and wherein the core layer comprises random copolymer of propylene and at least one modifier, wherein the at least one modifier comprises ethylene elastomer(s), ethylene-octene block copolymer, propylene elastomer(s), propylene plastomer(s), or any mixture thereof.

Example 7.2

A shrink face film according to example 7.1, wherein the propylene terpolymer is at least one of the following: 1-butene/propylene/ethylene, propylene/ethylene/1-hexene and propylene/ethylene/1-butene.

Example 7.3

A shrink face film according to example 7.1 or 7.2, wherein an amount of the propylene terpolymer(s) is between 1 and 99 wt. %

Example 7.4

A shrink face film according to any of the previous examples, wherein the core layer comprises between 50 and 90 wt. % of random copolymer of propylene and between 10 and 50 wt. % of the modifier.

Example 7.5

A shrink face film according to any of the previous examples, wherein the modifier is propylene elastomer or propylene plastomer.

Example 7.6

A shrink face film according to any of the examples 7.1 to 7.4, wherein the modifier is ethylene-octene block copolymer.

Example 7.7

A shrink face film according to claim any of the previous examples, wherein the face film is uniaxially oriented comprising an uniaxial orientation ratio between 2 and 10.

Example 7.8

A shrink face film according to claim any of the previous examples, wherein the face film has a shrinkage at least 15%, preferably at least 25%, or at least 35% above temperature of 65° C.

Example 7.9

A shrink label comprising a face film according to any of the previous examples 7.1-7.8.

Example 7.10

A method for manufacturing a shrink face film,
providing a multilayer face film comprising a first skin layer, a second skin layer and a core layer in between the skin layers, wherein the first skin layer and the second skin layer comprises propylene terpolymer, and wherein the core layer comprises random copolymer of propylene and at least one modifier, wherein the at least one modifier comprises ethylene elastomer(s), ethylene-octene block copolymer, propylene elastomer(s), propylene plastomer(s), or any mixture thereof;
stretching of the multilayer face film uniaxially at temperature between 50 and 130° C. so as to provide an uniaxially oriented multilayer face film;
cooling the uniaxially oriented multilayer face film so as to provide shrink potential in the stretching direction.

Example 7.11

A method for labelling of an item with a shrink label comprising a shrink face film according to any of the preceding examples 7.1-7.8:
cutting the face film into desired length of a shrink label;
wrapping the cut face film around a mandrel;
seaming the cut face film around the mandrel so as to form the shrink label;
applying the shrink label around the item, wherein the uniaxial orientation direction of the multilayer face film of the shrink label is extending circumferentially around the item; and
heating the shrink label at temperature between 65 and 140° C. so as to form a tight fitting label around the item.

Example 7.12

A shrink face film for a label capable to shrink under exposure to external energy, the face film comprising a first skin layer, a second skin layer and a core layer in between the skin layers, wherein the first skin layer and the second skin layer comprises propylene terpolymer, and wherein the core layer comprises propylene terpolymer and at least one modifier, wherein the at least one modifier comprises ethylene elastomer(s), ethylene-octene block copolymer, propylene elastomer(s), propylene plastomer(s), or any mixture thereof.

Example 7.13

A shrink face film according to example 7.12, wherein the propylene terpolymer is at least one of the following: 1-butene/propylene/ethylene, propylene/ethylene/1-hexene and propylene/ethylene/1-butene.

Example 7.14

A shrink face film according to example 7.12 or 7.13, wherein an amount of the propylene terpolymer(s) in the skin layers is between 1 and 99 wt. %

Example 7.15

A shrink face film according to any of the examples 7.12 to 7.14, wherein the core layer comprises between 50 and 90 wt. % of propylene terpolymer and between 10 and 50 wt. % of the modifier.

Example 7.16

A shrink face film according to any of the examples 7.12 to 7.15, wherein the modifier is ethylene-octene block copolymer.

Example 7.17

A shrink face film according to any of the examples 7.12 to 7.16, wherein the core layer further comprises heterophasic propylene-ethylene copolymer or polybutene-etylene copolymer.

Example 7.18

A shrink face film according to claim any of the examples 7.12 to 7.17, wherein the face film is uniaxially oriented comprising an uniaxial orientation ratio between 2 and 10.

Example 7.19

A shrink face film according to claim any of the examples 7.12 to 7.18, wherein the face film has a shrinkage at least 15%, preferably at least 25%, or at least 35% above temperature of 65° C.

Example 7.20

A shrink label comprising a face film according to any of the examples 7.12-7.19.

Example 7.21

A method for manufacturing a shrink face film,
  providing a multilayer face film comprising a first skin layer, a second skin layer and a core layer in between the skin layers, wherein the first skin layer and the second skin layer comprise propylene terpolymer, and wherein a core layer comprises propylene terpolymer and at least one modifier, wherein the at least one modifier comprises ethylene elastomer(s), ethylene-octene block copolymer, propylene elastomer(s), propylene plastomer(s), or any mixture thereof;
  stretching of the multilayer face film uniaxially at temperature between 50 and 130° C. so as to provide an uniaxially oriented multilayer face film;
  cooling the uniaxially oriented multilayer face film so as to provide shrink potential in the stretching direction.

Example 7.22

A method for labelling of an item with a shrink label comprising a shrink face film any of the examples 7.12-7.19:
  cutting the face film into desired length of a shrink label;
  wrapping the cut face film around a mandrel;
  seaming the cut face film around the mandrel so as to form the shrink label;
  applying the shrink label around the item, wherein the uniaxial orientation direction of the multilayer face film of the shrink label is extending circumferentially around the item; and
  heating the shrink label at temperature between 65 and 140° C. so as to form a tight fitting label around the item.

Example 7.23

A shrink face film for a label capable to shrink under exposure to external energy, the face film comprising a first skin layer, a second skin layer and a core layer in between the skin layers, wherein the first skin layer and the second skin layer comprises propylene block copolymer and at least one modifier, and wherein the core layer comprises propylene terpolymer and at least one modifier, wherein the at least one modifier in the skin layers and in the core layer comprises ethylene elastomer(s), ethylene-octene block copolymer, propylene elastomer(s), propylene plastomer(s), or any mixture thereof.

Example 7.24

A shrink face film according to example 7.23, wherein the propylene terpolymer is at least one of the following: 1-butene/propylene/ethylene, propylene/ethylene/1-hexene and propylene/ethylene/1-butene.

Example 7.25

A shrink face film according to example 7.23 or 7.24, wherein the core layer comprises between 50 and 90 wt. % of the propylene terpolymer and between 10 and 50 wt. % of the modifier.

Example 7.26

A shrink face film according to any of the examples 7.23 to 7.25, wherein the modifier in the core layer is ethylene-octene block copolymer.

Example 7.27

A shrink face film according to any of the examples 7.23 to 7.25, wherein the modifier in the core layer is propylene elastomer or propylene plastomer.

Example 7.28

A shrink face film according to any of the examples 7.23 to 7.27, wherein the core layer further comprises heterophasic propylene-ethylene copolymer or polybutene-etylene copolymer.

Example 7.29

A shrink face film according to any of the examples 7.23 to 7.28, wherein the modifier in the skin layers is propylene elastomer or propylene plastomer.

Example 7.30

A shrink face film according to any of the examples 7.23 to 7.29, wherein the face film is uniaxially oriented comprising an uniaxial orientation ratio between 2 and 10.

Example 7.31

A shrink face film according to claim any of the examples 7.23 to 7.30, wherein the face film has a shrinkage at least 15%, preferably at least 25%, or at least 35% above temperature of 65° C.

Example 7.32

A shrink label comprising a face film according to any of the examples 7.23-7.31.

Example 7.33

A method for manufacturing a shrink face film,
  providing a multilayer face film comprising a first skin layer, a second skin layer and a core layer in between the skin layers, wherein the first skin layer and the second skin layer comprises propylene block copolymer and at least one modifier, and wherein the core layer comprises propylene terpolymer and at least one modifier, wherein the at least one modifier comprises ethylene elastomer(s), ethylene-octene block copolymer, propylene elastomer(s), propylene plastomer(s), or any mixture thereof;
  stretching of the multilayer face film uniaxially at temperature between 50 and 130° C. so as to provide an uniaxially oriented multilayer face film;
  cooling the uniaxially oriented multilayer face film so as to provide shrink potential in the stretching direction.

Example 7.34

A method for labelling of an item with a shrink label comprising a shrink face film according to any of the examples 7.23-7.33:
  cutting the face film into desired length of a shrink label;
  wrapping the cut face film around a mandrel;
  seaming the cut face film around the mandrel so as to form the shrink label;

applying the shrink label around the item, wherein the uniaxial orientation direction of the multilayer face film of the shrink label is extending circumferentially around the item; and heating the shrink label at temperature between 65 and 140° C. so as to form a tight fitting label around the item.

For the person skilled in the art, it will be clear that modifications and variations of the products and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A shrink face film for a label capable to shrink under exposure to external energy, the face film comprising a first skin layer, a second skin layer and a core layer in between the first skin layer and the second skin layer, wherein
the core layer consists of between 50 and 70 wt. % of propylene random copolymer(s) of propylene-ethylene or propylene-butylene, and total amount between 30 and 50 wt. % of a modifier which is ethylene-octene block copolymer or at least one of ethylene/octene elastomer and ethylene/butene elastomer.

2. A shrink face film according to claim 1, wherein the first skin layer and the second skin layer include at least one of the following propylene terpolymers: 1-butene/propylene/ethylene, propylene/ethylene/1-hexene and propylene/ethylene/1-butene.

3. A shrink face film according to claim 2, wherein an amount of the terpolymer(s) is between 1 and 99 wt. %.

4. A shrink face film according to claim 1, wherein the first skin layer and the second skin layer include at least 50 wt. % of propylene terpolymer(s) and further at most 50 wt. % of heterophasic propylene-ethylene copolymer(s) and/or propylene random copolymer(s).

5. A shrink face film according to claim 1, wherein the first skin layer and the second skin layer include between 50 and 98 wt. % of propylene random copolymer(s).

6. A shrink face film according to claim 5, wherein the first skin layer and the second skin layer further comprise at most 50 wt. % of heterophasic propylene-ethylene copolymer(s).

7. A shrink face film according to claim 1, wherein the face film is uniaxially oriented comprising an uniaxial orientation ratio between 2 and 10.

8. A shrink face film according to claim 1, wherein the face film has a shrinkage at least 15%, preferably at least 25%, or at least 35% above temperature of 65° C.

9. A shrink label capable to shrink under exposure to external energy comprising a face film according to claim 1.

10. A method for manufacturing a shrink face film,
providing a multilayer face film comprising a first skin layer, a second skin layer and a core layer in between the skin layers, wherein the core layer consists of between 50 and 70 wt. % of propylene random copolymer(s) of propylene-ethylene or propylene-butylene, and total amount between 30 and 50 wt. % of a modifier which is ethylene-octene block copolymer or at least one of ethylene/octene elastomer and ethylene/butene elastomer;
stretching of the multilayer face film uniaxially at temperature between 50 and 130° C. so as to provide an uniaxially oriented multilayer face film;
cooling the uniaxially oriented multilayer face film so as to provide shrink potential for the face film in the stretching direction.

11. A method for labelling of an item with a shrink label comprising a shrink face film according to claim 1:
cutting the face film into desired length of the shrink label;
wrapping the cut face film around a mandrel;
seaming the cut face film around the mandrel so as to form the shrink label;
applying the shrink label around the item, wherein the uniaxial orientation direction of the multilayer face film of the shrink label is extending circumferentially around the item; and
heating the shrink label at temperature between 65 and 140° C. so as to form a tight fitting label around the item.

12. A combination of an item and a shrink label according to claim 9, wherein the label is shrunk around the item.

* * * * *